United States Patent [19]

Baumann

[11] Patent Number: 4,858,161

[45] Date of Patent: Aug. 15, 1989

[54] METHOD FOR THE AUTOMATIC CALIBRATION OF A HIGH-RESOLUTION ELECTRONIC BALANCE

[75] Inventor: Arthur Baumann, Bertschikon, Switzerland

[73] Assignee: Mettler Instrumente AG, Greifensee, Switzerland

[21] Appl. No.: 10,866

[22] Filed: Feb. 4, 1987

[30] Foreign Application Priority Data

May 23, 1986 [CH] Switzerland .................... 095/86

[51] Int. Cl.$^4$ ...................... G01G 23/01; G01G 23/48
[52] U.S. Cl. ................................ 364/571.03; 364/567
[58] Field of Search ................... 177/1, 25.13, 50, 226; 364/567, 568, 571, 571.03

[56] References Cited

U.S. PATENT DOCUMENTS

| | | | |
|---|---|---|---|
| 4,080,657 | 3/1978 | Caldicott et al. | 364/571 X |
| 4,464,725 | 8/1984 | Briefer | 364/567 X |
| 4,535,854 | 8/1985 | Gard et al. | 177/25.13 X |
| 4,656,599 | 4/1987 | Knothe et al. | 364/517 X |

FOREIGN PATENT DOCUMENTS

| | | |
|---|---|---|
| 44707 | 1/1982 | European Pat. Off. . |
| 3106534 | 10/1982 | Fed. Rep. of Germany . |
| 1532362 | 11/1978 | United Kingdom . |

Primary Examiner—Parshotam S. Lall
Assistant Examiner—Edward R. Cosimano
Attorney, Agent, or Firm—Pennie & Edmonds

[57] ABSTRACT

The calibration process is initialized as a function of the past measurement results. The time to the next calibration is dependent on the quality of the calibrations in the past. Before the calibrating of the balance, the program checks a number of parameters, which can affect the weighing result and compares the results with predetermined limits. If set conditions are exceeded, the program in each case returns to the beginning and starts anew.

24 Claims, 4 Drawing Sheets

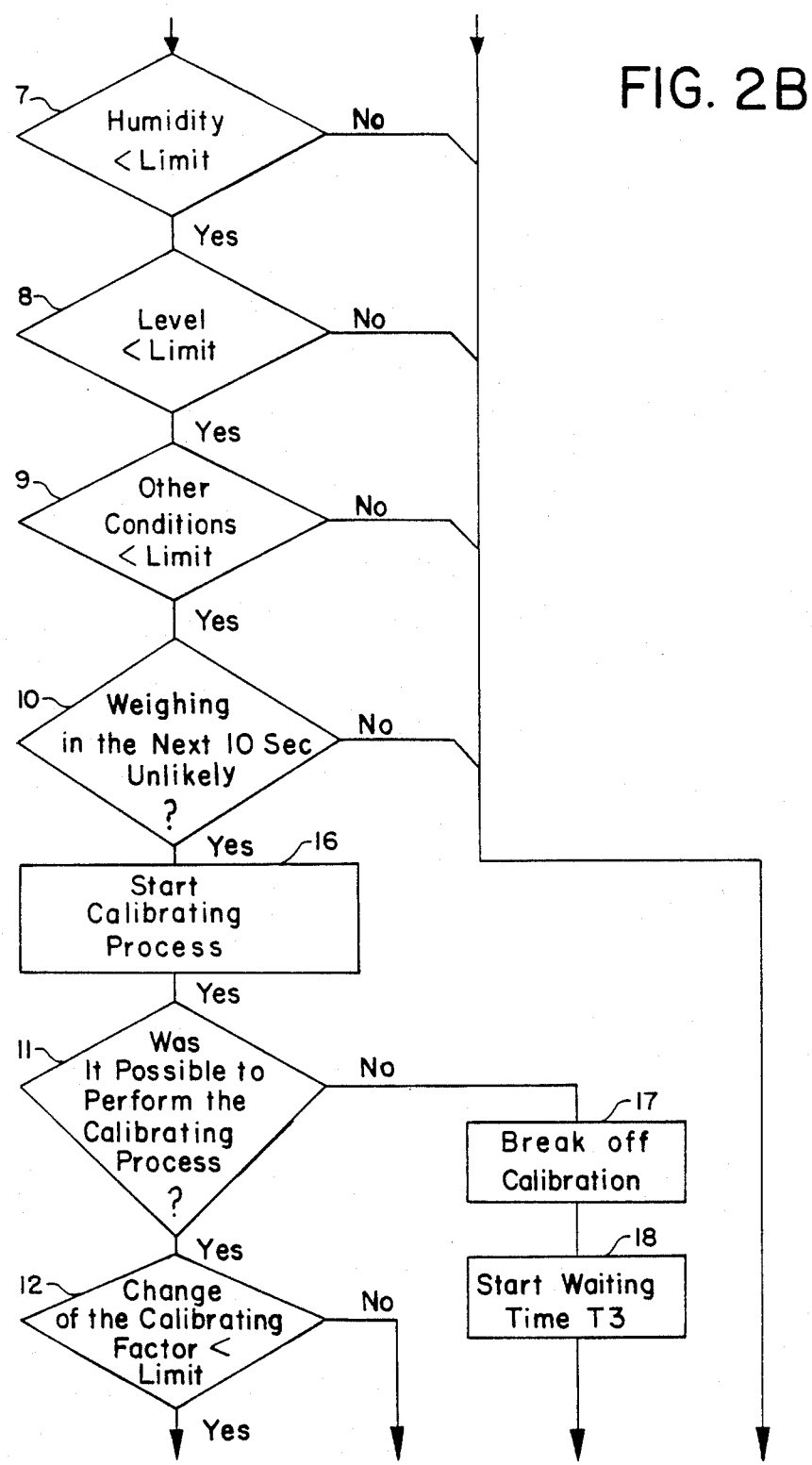

METHOD FOR THE AUTOMATIC CALIBRATION OF A HIGH-RESOLUTION ELECTRONIC BALANCE

BACKGROUND OF THE INVENTION

The invention relates to a process for the automatic calibration of a high-resolution electronic balance, in which the changes in the parameters affecting the weighing system are detected and processed by the evaluation circuit of the weighing system and/or a microprocessor.

In high resolution balances, changes in temperature, air pressure, aging of the components, etc., affect the balance so that the indicated weight is not correct. A periodic recalibration of the balance therefore is absolutely necessary.

Error compensation processes for electronic high-resolution balances are known. From DE-A1-31 06 534 it is known to detect the current air pressure and continuously to take the detected value into consideration in the electronic evaluation of weight.

In CH-PS 624 773, correction values for several components which can affect the measurement result are detected and recorded. Moreover, temperature coefficients and changes in values caused by age are detected and taken into consideration by the computer in the calculation of the final measurement result.

These known error compensation processes use changes in values of the factors affecting the measurement result for continuous correction of the measurement result. In particular a calibrating factor is determined which corrects the weighing results so that the indicated weight agrees with the laid on weight.

Another known process described in EP-A1-0 044 707 comprises an automatic recalibration which is triggered after a specific time has passed or a given number of weighings have been made or after each taring. Such a rigid recalibration rule results in recalibration being performed when objectively it would not be necessary, and thus constitutes an often unnecessary disturbance during a series of weighings.

A disadvantage of these compensation processes is that they tend to be made without regard for the need for recalibration or its efficacy.

SUMMARY OF THE INVENTION

An object of the present invention is to provide a process which makes it possible to calibrate the balance as a function of the past measuring results and the course of the disturbance variables. As a result, recalibrations are made on an as needed basis.

The invention attains this object with a checking program that is run in time intervals controlled by the course of the disturbance variables. This program monitors the environmental parameters affecting the weighing result and checks the individual limits assigned to the parameters. If the limits are not reached and if a weighing is not in process at that moment, it introduces or indicates a calibration.

This arrangement permits the program to recalibrate the balance using the parameters monitored by the checking program. In this way, even disturbance variables, e.g., effects of vibrations, inclination of the balance, etc., which occur if no weighing takes place and disturbance variables which are not suitable for a direct processing in the measurement result can be taken into consideration in the recalibration process.

BRIEF DESCRIPTION OF DRAWINGS

These and other objects, features and advantages of the invention will be more readily apparent from the following detailed description of a preferred embodiment of the invention in which:

FIGS. 2A to 2C are flowcharts useful in understanding the preferred embodiment of the invention.

DETAILED DESCRIPTION OF PREFERRED EMBODIMENT

Figure 1:
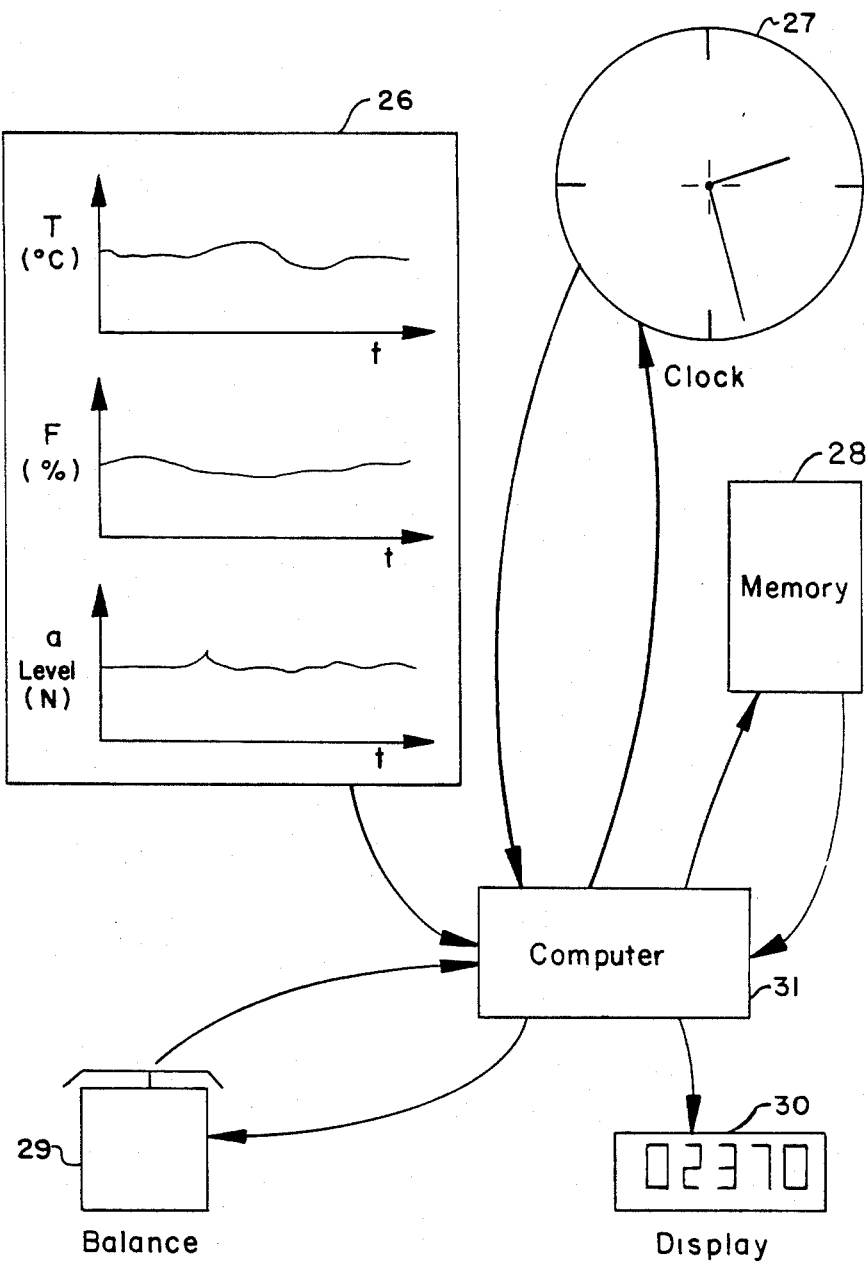
FIG. 1 is a block diagram of a preferred embodiment of the invention.

As shown in FIG. 1, a weighing system of the present invention comprises a balance 29, a clock 27, a nonvolatile memory 28 for storage of the past measuring results of the balance, a display 30 and a computer 31. Block 26 illustrates three environmental influences that can affect calibration: temperature T, humidity F and level N over time t. Clock 27 and memory 28 are used to trigger recalibration as a function of the time passed since the last calibration or a function of the past measuring results. Block 26 sets limit values for various environmental parameters beyond which the data of the balance are no longer guaranteed.

The computer in block 31 processes the values fed to it and triggers the calibration of the balance and/or activates an appropriate optical or acoustical indication as described below.

Figure 2A:
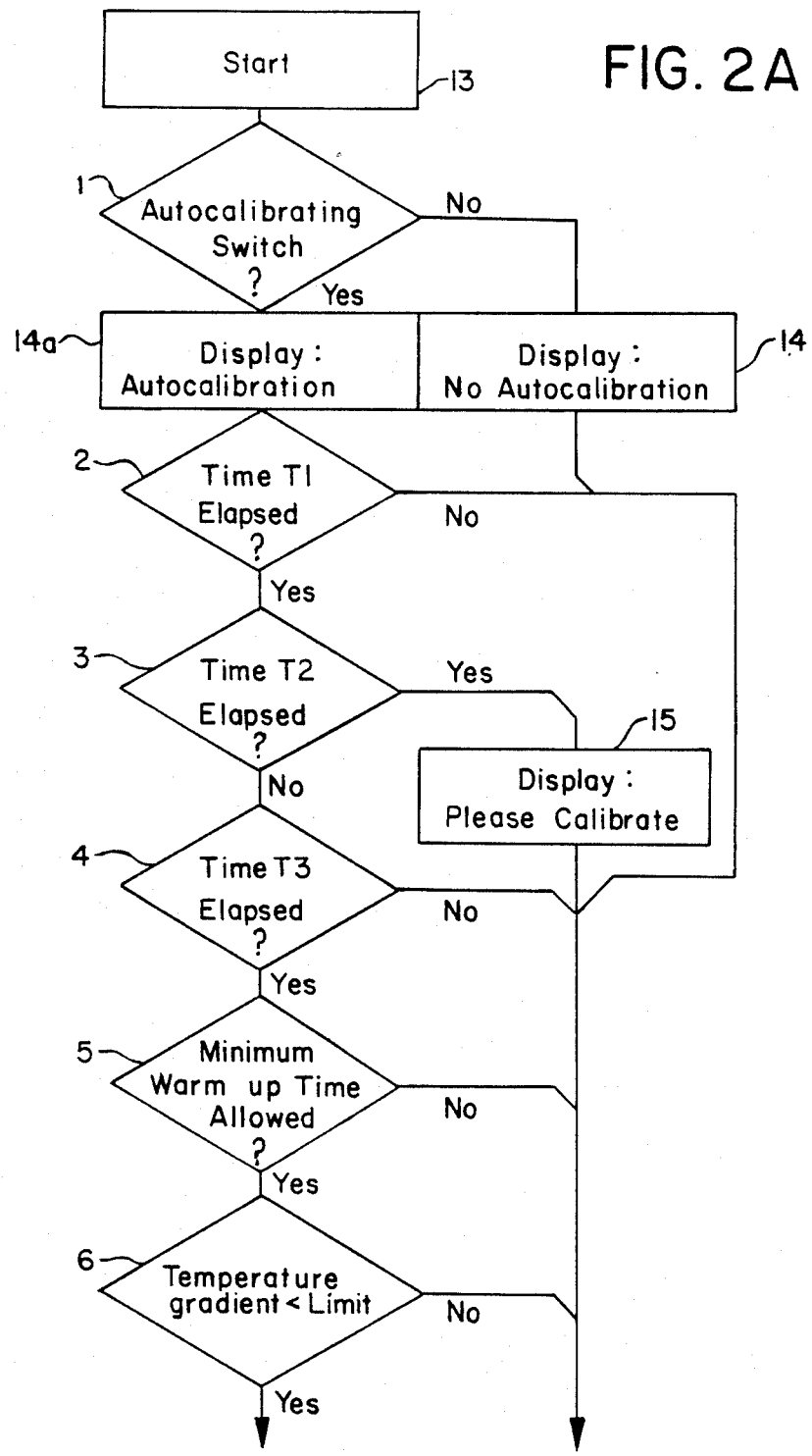
Figure 2C:
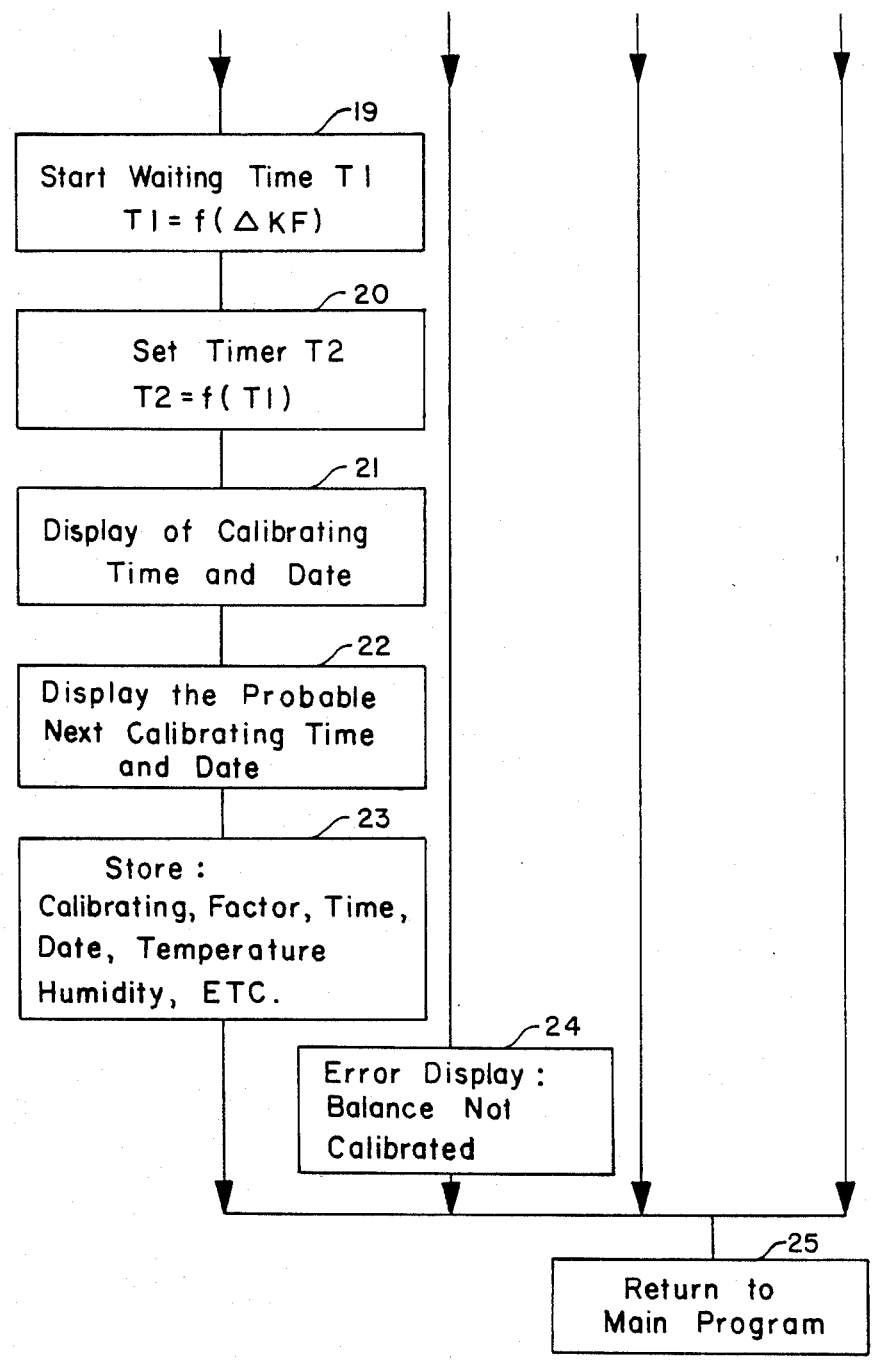

A calibration is explained in more detail by the flowchart of FIGS. 2A to 2C which represents an "autocalibration" program, as it is stored and run in the computer:

The main program (not shown) illustratively jumps once per second to block 13, the beginning of the program routine for "autocalibration."

In the first step the position of a switch that controls autocalibration is interrogated. If the switch is on "manual calibration," the computer causes the text "no autocalibration" to be displayed on display 30, as shown in block 4 and the program returns to the main program, as shown in block 25. If the switch is on "autocalibration," the text "autocalibration" is displayed on display 30, as shown in block 14a, and the program continues.

Steps 2, 3 and 4 establish a timing window in which recalibration can be made by the program. The location of this window in time is a function of past measuring results and the time since the last failure to run the recalibration program. The edges of the timing window are specified by times T1 and T2 where T2>T1 and the time since the last recalibration failure is specified by time T3.

In step 2, the program tests if time T1 has elapsed. If time T1 has not elapsed, the program returns to the main program, as shown in block 25. If time T1 has elapsed, the program continues to step 3.

Time T1 has a variable magnitude which is determined by the past measuring results and in particular is inversely proportional to the extent of recalibration required in the immediately preceding calibrations. For example, let us assume that in the last calibration a calibrating factor (scaling) of 1.004 was determined and that a new measurement produces a calibrating factor of 1.006. The difference (deviation) from the old to the new calibrating factor is $1.006-1.004=0.002=\Delta KF$. The calibrating time T1 is specified by $T1 = C \cdot 1/\Delta KF$ where C is a constant. As a result, the time between recalibrations is shortened where there is a larger deviation between successive determinations of calibrating factors and it is lengthened where the deviation is reduced.

The specific relation set forth above between time T1 and deviation ($\Delta KF$) is not required. In general, time T1 can be determined from any useful function of deviation e.g., $T1 = f(\Delta KF)$, and a different relation may be used in each balance or set of operating conditions.

In step 3 the program tests if time T2 has elapsed. If the time T2 has elapsed, the recalibration window has passed and the program cannot perform the recalibration. Accordingly, the text "PLEASE CALIBRATE" is displayed by display 30 as shown in block 15, and the program returns to the main program, as shown in block 25. This display requests the user to recalibrate the balance by hand. If time T2 has not yet elapsed, recalibrations can be made by the program, and the program continues to step 4.

Time T2 is a function of time T1. In the simplest case, a constant time M is added to time T1 such that $T2 = T1 + M$. Other functions are also conceivable.

In step 4 the program tests if sufficient time T3 has passed since the last recalibration failure. If time T3 has not elapsed, the program returns to the main program, as shown in block 25. If time T3 has elapsed, the program continues to step 5.

In step 5 a check is made to see whether a sufficiently long warm-up time has been allowed for the instrument to warm-up. If this is not the case, a return to the main program takes place, as shown in block 25. If this condition is met, the program continues to step 6.

In step 6 a check is made to determine whether the temperature gradient of the temperature measuring system is less than a predetermined magnitude (limit) in positive or negative direction. If it is not, the program returns to the main program, as shown in block 25, so as to prevent a recalibration during a strong temperature rise or temperature drop. If, however, the condition is met, the program continues to step 7.

In steps 7, 8 and 9, in analogous fashion to step 6, the program checks the magnitudes of various parameters affecting the calibration for limit values. If at any one of these steps, the limit value is exceeded, a return to the main program takes place, as shown in block 25. If all the environmental values are less than their limits, the program continues to step 10.

In step 10 a check is made to determine whether a weighing is unlikely in the next y seconds where y is a variable value and illustratively is ten seconds. For this purpose another program monitors the measurement results of the last x minutes where x is a variable value. If the balance has not been used in the last x minutes, i.e., no movement was observed on the scalepan, it can be assumed that in the next y seconds no weighing will be performed and the program commences the calibration process, as shown in block 16.

On the other hand, if the scalepan has been moved in the last x minutes, the program returns to the main program, as shown in block 25.

In step 11 a check is made to see whether the recalibration could be performed. For example, it may be impossible to perform the recalibration because of a power failure or disturbing vibrations. If the recalibration cannot be performed, the process is interrupted, as shown in block 17, an adjustable timer is started, as shown in block 18, and the program returns to the main program as shown in block 25. This timer accumulates the elapsed time T3 from failure of the recalibration check. In conjunction with the test that occurs in step 4, this prevents a recalibration process from immediately being started in the next program run and delays the next recalibration attempt until time T3 has run out. Illustratively, T3 is 10 minutes. If it is possible to perform the calibration, the program continues to step 12.

In step 12 a check is made to determine whether the difference between the new and old calibrating factors ($\Delta KF$) is less than a predetermined magnitude. If the difference between the old and new calibrating factors ($\Delta KF$) exceeds the limit, this points to an inadmissibly large change of one of the disturbance variables, which possibly rules out an autocalibration of the balance. With a new run of the main program this disturbance can be found. Accordingly, if the limit is exceeded, an error display "Balance not calibrated" is generated on display 30, as shown in block 24, and the program returns to the main program, as shown in block 25.

If the change ($\Delta KF$) is smaller than the preset limit, the times T1 and T2 are calculated according to the rules described above, and suitable timer(s) for accumulating these times are started, as shown in blocks 19 and 20. Then the time and date of the last and next probable calibrations are brought to the display 30, as shown in blocks 21 and 22. Finally, the calibrating factor and other magnitudes of interest (temperature, temperature gradient, humidity, level, time, date, etc.) are filed in tabular form in nonvolatile memory 28, as shown in block 23.

If the balance cannot be calibrated, the past measurement results ($\Delta KF$, etc.) can be read from the nonvolatile memory 28; and conclusions can possibly be drawn from these results concerning the failure.

Finally the program returns to the beginning of the main program, as shown in block 25.

As will be evident to those skilled in the art, numerous modifications can be made in the above-described invention. The frequency of testing can be varied and different environmental parameters can be used to control the desirability of testing. The nature of the displays may be varied to provide additional information. For example, in some cases, it can be useful to indicate that parameters such as temperature, humidity, etc., change too rapidly in time and thus no guaranteed weighing data are to be expected.

What is claimed is:

1. A method for determining whether to perform automatic calibration of a high-resolution electronic balance comprising the repeated execution of a checking program, the steps of said checking program comprising:

monitoring at least one environmental parameter which affects the weighing result, and comparing said at least one environmental parameter with a corresponding assigned threshold to determine that an automatic calibration should be performed if said at least one environmental parameter does not reach said threshold.

2. The method according to claim 1 wherein the checking program further comprises the step of determining whether the balance is conditioned for autocalibration and moves on to a next step in the program if it is so conditioned or returns to the beginning if it is not.

3. The method according to claim 1 wherein the checking program further comprises the step of making an interrogation whether a weighing is or is not likely in the next predetermined period of time and either a calibration process is triggered if no weighing is likely in such predetermined period or a return is made to the main program if a weighing is likely, wherein the predetermined period is a function of time since a last weighing.

4. The method according to claim 1 wherein the checking program further comprises the step of interrogating a timer to determine if an adjustable time (T1) has elapsed and moves on to a next step of the program if it has or returns to the beginning of the program if it has not, where the time (T1) is a function of the difference between successive calibrating factors determined in prior calibrations.

5. The method according to claim 1 wherein the checking program further comprises the step of interrogating a timer to determine if an adjustable time (T1) has elapsed and moves on to a next step of the program if it has or returns to the beginning of the program if it has not, where the time (T1) is a function of at least one calibrating factor (KF) determined in a prior calculation.

6. The method according to claim 5 wherein the checking program further comprises the step of interrogating a timer to determine if an adjustable time (T2) has elapsed and moves on to a next step of the program if it has not or issues a call for manual calibration of the balance if it has, where T2 is greater than T1.

7. The method according to claim 6 wherein the checking program further comprises the step of interrogating a timer to determine if a time (T3) has not elapsed, and moves on to a next step of the checking program if it has or exits the checking program if it has not.

8. The method according to claim 6 wherein the checking program further comprises the step of checking to see whether a calibration process could be performed, and in case the calibration process can be performed, recalculates the calibrating factor (KF) and sets new times (T1) and (T2) in timers provided the recalibrated calibrating factor does not exceed a predetermined value.

9. The method according to claim 8 wherein the checking program further comprises the step of storing a next probable calibrating time and calibrating factor.

10. The method according to claim 9 wherein the checking program further comprises the step of indicating if a change of calibrating factor is greater than a predetermined value.

11. The method according to claim 1 wherein the checking program further comprises the steps of:
checking whether a first time (T1) has elapsed, wherein the first time (T1) is a function of at least one calibrating factor (KF) determined in a prior calculation, and returning to a main program if the first time (T1) has not elapsed or continuing to the next step if the first time (T1) has elapsed; and
checking whether a second time (T2) has elapsed, wherein a second time (T2) is a function of and greater than the first time (T1), and returning to the main program if the second time (T2) has elapsed or continuing to the next step if the second time (T2) has not elapsed.

12. The method of claim 11 wherein the checking program further comprises the step of checking whether a third time (T3) has elapsed, wherein the third time (T3) represents a period of time since a failure of a previous calibration, and returning to the main program if the third time (T3) has not elapsed and continuing if the third time (T3) has elapsed.

13. The method according to claim 11 wherein the checking program further comprises the steps of:
checking whether a change in one of said parameters is less than a predetermined, adjustable limit value, and returning to a main program if the change is greater than the limit or continuing to the next step if the change is less than the limit; and
repeating the previous step as desired for at least one other parameter.

14. The method according to claim 11 wherein the checking program further comprises the step of determining whether a weighing is likely during an ensuing time interval and returning to the start of the main program if a weighing is likely or continuing to the next step if a weighing is unlikely, where the ensuing time interval is a function of the time since a previous weighing.

15. The method according to claim 14 wherein the checking program further comprises the steps of returning to the main program and indicating whether the change in the calibrating factor is greater than a predetermined value.

16. The method according to claim 11 wherein the checking program further comprises the steps of:
checking whether the calibration process can be performed, and returning to the main program if it cannot be performed or continuing to the next step if it can be performed; and
checking whether said calibrating factor is less than a predetermined limit value, and returning to the main program if the calibrating factor is not less than the limit value or calculating said first and second times (T1, T2) to set two corresponding timers if the calibrating factor is less than the limit value.

17. The method according to claim 16 wherein the step of checking whether the calibrating factor has reached or exceeded a predetermined limit value further comprises storing a next probable calibrating time and the calibrating factor in a nonvolitile memory if the limit value has not been reached.

18. A method for determining whether to implement automatic calibration of a high-resolution electronic balance comprising the repeated execution of a checking program wherein the checking program successively tests predetermined, adjustable limit values of a plurality of environmental parameters and, if the limit value has not been reached, moves on to a next step of the checking program or exits the checking program if the limit value has been exceeded.

19. A method for the automatic calibration of a high-resolution electronic balance in which changes in environmental parameters affecting the balance are detected and processed by an evaluation means comprising the repeated execution of a checking program comprising the steps of:
checking whether an autocalibration mode has been selected, and returning to a main program if the autocalibration mode has not been selected or continuing to the next step if the autocalibration mode has been selected;
checking whether a first time (T1) has elapsed, wherein the first time (T1) is a function of at least one calibrating factor (KF) determined in a prior calculation, and returning to the main program if the first time (T1) has not elapsed or continuing to the next step if the first time (T1) has elapsed;

checking whether a second time (T2) has elapsed, wherein the second time (T2) is a function of and greater than the first time (T1), and returning to the main program if the second time (T2) has elapsed or continuing to the next step if the second time (T2) has elapsed;

checking whether a third time (T3) has elapsed, wherein the third time (T3) is the time since a most recent recalibration failure, and returning to the main program if the third time (T3) has not elapsed or continuing to the next step if the third time (T3) has elapsed;

checking whether a sufficient warm-up time for the electronic balance has elapsed, and returning to the main program if the warm-up time has not elapsed or continuing to the next step if the warm-up time has elapsed;

checking whether a change in each of a plurality of environmental parameters is less than a predetermined, adjustable limit value, and returning to the main program if the change is greater than the limit value or continuing to the next step if the change is less than the limit value;

determining whether a weighing is likely during an ensuing time interval and returning to the main program if a weighing is likely or continuing to the next step if a weighing is unlikely;

starting a calibrating process;

determining whether it is possible to perform the calibrating process and breaking off the calibrating process and starting a timer to accumulate the elapsed third time (T3) and returning to the main program if it is not possible to perform the calibrating process or continuing to the next step if it is possible to perform the calibrating process;

checking whether the difference between a new calibrating factor and a previous calibrating factor is less than a predetermined limit value, and returning to the main program if the calibrating factor is not less than the limit value or calculating said first and second times (T1, T2) to set two corresponding timers and storing a next probable calibrating time and the calibrating factor in a nonvolatile memory if the calibrating factor is less than the limit value; and returning to the main program and indicating whether the change in the calibrating factor is greater than a predetermined value.

20. A method for the automatic calibration of a high-resolution electronic balance in which changes in environmental parameters affecting the balance are detected and processed by an evaluation means comprising the repeated execution of a checking program comprising the steps of:

checking whether an autocalibration mode has been selected, and returning to a main program if the autocalibration mode has not been selected or continuing to the next step if the autocalibration mode has been selected;

checking whether a first time (T1) has elapsed, wherein the first time (T1) is a function of the difference between calibrating factors determined in a preceding pair of consecutive calculations, and returning to the main program if the first time (T1) has not elapsed or continuing to the next step if the first time (T1) has elapsed;

checking whether a second time (T2) has elapsed, wherein the second time (T2) is a function of and greater than the first time (T1), and returning to the main program if the second time (T2) has elapsed or continuing to the next step if the second time (T2) has not elapsed;

checking whether a third time (T3) has elapsed, wherein the third time (T3) is the time since a most recent recalibration failure, and returning to the main program if the third time (T3) has not elapsed or continuing to the next step if the third time (T3) has elapsed;

checking whether a sufficient warm-up time for the electronic balance has elapsed, and returning to the main program if the warm-up time has not elapsed or continuing to the next step if the warm-up time has elapsed;

checking whether a change in each of a plurality of environmental parameters is less than a predetermined, adjustable limit value, and returning to the main program if the change is greater than the limit value or continuing to the next step if the change is less than the limit value;

determining whether a weighing is likely during an ensuing time interval and returning to the main program if a weighing is likely or continuing to the next step if a weighing is unlikely;

starting a calibrating process;

determining whether it is possible to perform the calibrating process and breaking off the calibrating process and starting a timer to accumulate the elapsed third time (T3), and returning to the main program if it is not possible to perform the calibrating process or continuing to the next step if it is possible to perform the calibrating process;

checking whether the difference between a new calibrating factor and a previous calibrating factor is less than a predetermined limit value, and returning to the main program if the calibrating factor is not less than the limit value or calculating said first and second times (T1, T2) to set two corresponding timers and storing a next probable calibrating time and the calibrating factor in a nonvolatile memory if the calibrating factor is less than the limit value; and returning to the main program and indicating whether the change in the calibrating factor is greater than a predetermined value.

21. A method for determining whether to perform automatic calibration of a high-resolution electronic balance in which changes in parameters affecting the balance are detected and processed by an evaluation means comprising the steps of:

running a checking program at regular intervals, interrogating with said program a timer to determine if an adjustable time (T1) has elapsed and moving on to a next step of the program if it has or returning to a main program if it has not, where the time (T1) is a function of at least one calibrating factor (KF) determined in a prior calculation, monitoring with said program at least one environmental parameter which affects the weighing result, and comparing with said program said at least one environmental parameter with a corresponding assigned threshold to determine that an automatic calibration should be performed if said at least one environmental parameter does not reach said threshold.

22. The method according to claim 21 wherein the checking program further comprises the steps of:
checking whether a second time (T2) has elapsed, wherein the second time (T2) is a function of and greater than the first time (T1), and returning to the main program if the second time (T2) has elapsed or continuing to the next step if the second time (T2) has not elapsed.

23. A method for determining whether to perform the automatic calibration of a high-resolution electronic balance in which changes in parameters affecting the balance are detected and processed by an evaluation means comprising the steps of:
running a checking program at regular intervals,
interrogating with said program a timer to determine if an adjustable time (T1) has elapsed and moving on to a next step of the program if it has or returning to a main program if it has not, where the time (T1) is a function of a difference between calibrating factors determined in a preceding pair of consecutive calibrations,
monitoring with said program at least one environmental parameter which affects the weighing result, and
comparing with said program said at least one environmental parameter with a corresponding assigned threshold to determine that an automatic calibration should be performed if said at least one environmental parameter does not reach said threshold.

24. The method according to claim 23 wherein the checking program further comprises the steps of:
checking whether a second time (T2) has elapsed, wherein the second time (T2) is a function of and greater than the first time (T1), and returning to the main program if the second time (T2) has elapsed or continuing to the next step if the second time (T2) has not elapsed.

* * * * *